United States Patent
Maritan et al.

(10) Patent No.: US 6,630,097 B1
(45) Date of Patent: Oct. 7, 2003

(54) METHOD FOR CONSTRUCTING A BENT-EDGE PLASTIC DOOR FOR A HOUSEHOLD ELECTRICAL APPLIANCE

(75) Inventors: Marco Maritan, Viggiu' (IT); Marco Signa, Induno Olona (IT)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 09/451,371

(22) Filed: Nov. 30, 1999

(30) Foreign Application Priority Data

Dec. 1, 1998 (IT) .......................... MI98A2602

(51) Int. Cl.[7] ............................................. B29C 51/10
(52) U.S. Cl. ................... 264/553; 264/238; 264/295; 264/296; 264/322; 29/428
(58) Field of Search ................. 264/553, 295, 264/296, 322, 238, 318; 29/428

(56) References Cited

U.S. PATENT DOCUMENTS

| | | | |
|---|---|---|---|
| 2,837,816 A | | 6/1958 | Saunders ................... 29/414 |
| 2,976,577 A | * | 3/1961 | Gould .................... 264/46.6 |
| 3,000,058 A | * | 9/1961 | Thielen, Jr. .................. 18/59 |
| 3,634,971 A | | 1/1972 | Kesling ........................ 49/460 |
| 3,637,971 A | * | 1/1972 | Kesling ........................ 49/460 |
| 3,770,546 A | * | 11/1973 | Childress et al. ............ 156/245 |
| 3,882,637 A | * | 5/1975 | Lindenschmidt ............. 49/501 |
| 4,896,415 A | | 1/1990 | Bock ........................... 29/453 |
| 5,624,623 A | | 4/1997 | Luch et al. .................. 264/296 |
| 5,716,581 A | * | 2/1998 | Tirrell et al. ................ 264/545 |
| 6,492,000 B1 | * | 12/2002 | Matsuki et al. ............. 428/124 |
| 6,508,973 B2 | * | 1/2003 | Beckmann et al. ......... 264/480 |

* cited by examiner

Primary Examiner—Edmund H. Lee
(74) Attorney, Agent, or Firm—Robert O. Rice; John F. Colligan; Stephen Krefman

(57) ABSTRACT

A method for constructing a plastic door for a household electrical appliance such as a refrigerator having an outer door shell to which is assembled an inner door liner. The outer shell is formed into a concave dished shape having a continuous side wall. Following forming, the edge of the shell side wall is heated and bent to form a flange extending toward the inner cavity of the shell. Heating and bending of the edge is implemented while maintaining the shell in a mould and acting on the free edge of the side wall. A door outer shell made by this method includes a side wall with the edge of the side wall bent towards the interior of the shell, and when a door liner is secured to the outer shell, the bent continuous edge of the side wall is exposed to view and has an attractive appearance.

4 Claims, 2 Drawing Sheets

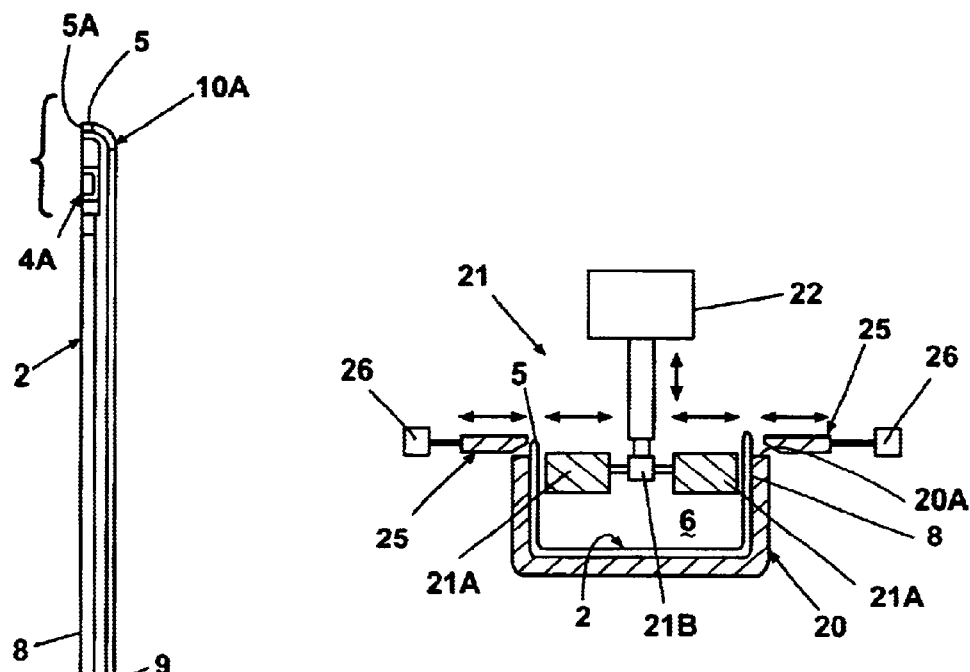
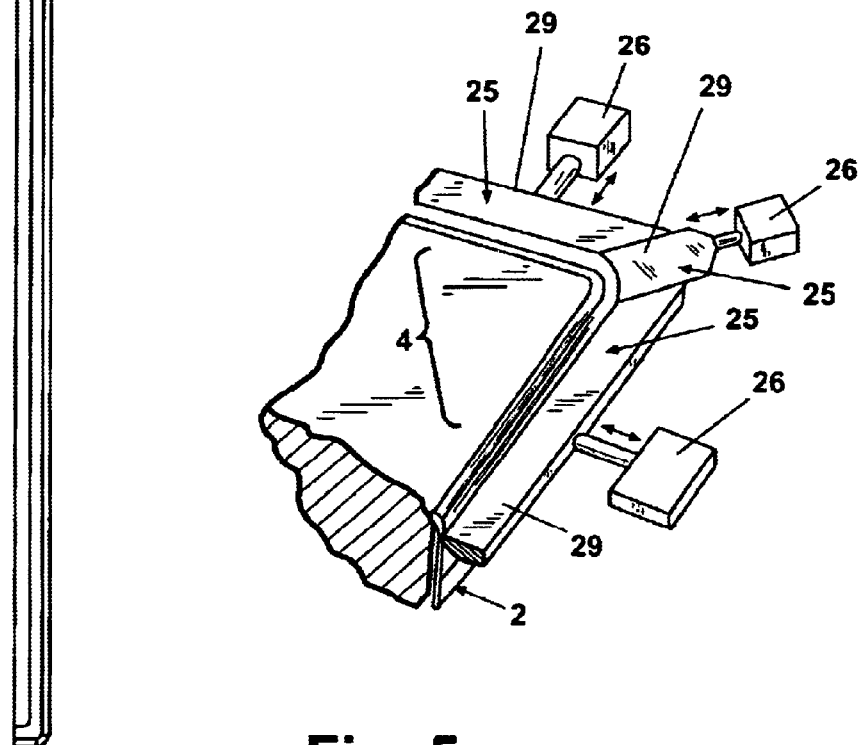

US 6,630,097 B1

METHOD FOR CONSTRUCTING A BENT-EDGE PLASTIC DOOR FOR A HOUSEHOLD ELECTRICAL APPLIANCE

BACKGROUND OF THE INVENTION

1. Field of the Invention

This invention relates to a method for constructing a plastic door for a household electrical appliance, and in particular a method for constructing a plastic door for a refrigerator and the refrigerator door obtained in this manner.

2. Description of the Related Art

As is well known, each refrigerator door, for example of a multi-compartment upright refrigerator, comprises a shell or outer part with which a door liner is associated. Usual insulating material is provided between the two parts. The door liner can comprise support shoulders for shelves to hold foods and food containers. A usual seal element is provided along the liner edge.

The door shell and, liner are produced by usual forming methods such as vacuum-forming or by pressing (moulding). After they have been formed they are joined together and insulating material such as polyurethane is inserted (injected) between them. The shell also supports usual junction pieces carrying the hinges or comprising seats for these latter.

The known method for producing a plastic door for a refrigerator generally results in a door being obtained having sharp edges. The joints between the shell and liner can often be seen along these edges. This obviously has a negative effect on the appearance of the product.

U.S. Pat. No. 5716581 describes a method for thermoforming a plastic refrigerator door of the aforesaid type. According to this known method a shell is formed with an annular flange facing the shell interior to receive the edge of a liner. In this respect, after the door liner has been thermoformed, a plastic sheet is laid on it and is itself thermoformed to form the shell. As soon as this has been completed the shell and liner are fitted together and heat is applied along their contacting edges to join them together by fusion of the parts. After the shell and liner have been joined together their end edges are cut off. This thus implies a final product which always has sharp edged lateral parts, and in which the shell and liner edges are recognizable. Consequently, the invention of this U.S. patent again results in a product which is not of perfect appearance.

SUMMARY OF THE INVENTION

An object of the invention is to provide an improved method for producing a thermoformed plastic door, by which the door is of attractive appearance.

A further object is to provide a method of the aforesaid type which is of reliable implementation and offers a product of constant results.

A further object is to provide a door produced by the aforesaid method which is of attractive appearance and does not present junction lines between the shell and liner along its lateral edges.

A further object is to provide a method which enables refrigerator doors to be produced which do not have to be subjected to final painting and which therefore enables doors to be obtained at lower cost than the doors produced by known methods.

In accord with the above objects, the present invention is directed to a method for constructing a door for a refrigerator. The door being of plastic and comprising a shell or outer part with which an inner door liner is associated and wherein the shell is formed by known forming methods such as vacuum-forming or pressing. Following the following step, the edge of said shell is deformed and bent towards the interior of this latter, the bending being implemented along the entire perimetrical edge of the shell. The process further includes the step of maintaining the shell within the forming mould when the perimetrical edge is bent. Alternatively, the shell may be transferred to another mould wherein the perimetrical edges are bent.

DESCRIPTION OF THE DRAWINGS

The invention will be more apparent from the accompanying drawing, which is provided by way of non-limiting example and on which:

FIG. 3 is a section on the line 3—3 of FIG. 1;

FIG. 4 is a schematic cross-section through a device for implementing the method of the invention; and FIG. 5 is a partial perspective view of part of the device of the invention.

DESCRIPTION OF THE PREFERRED EMBODIMENT

Figure 1:
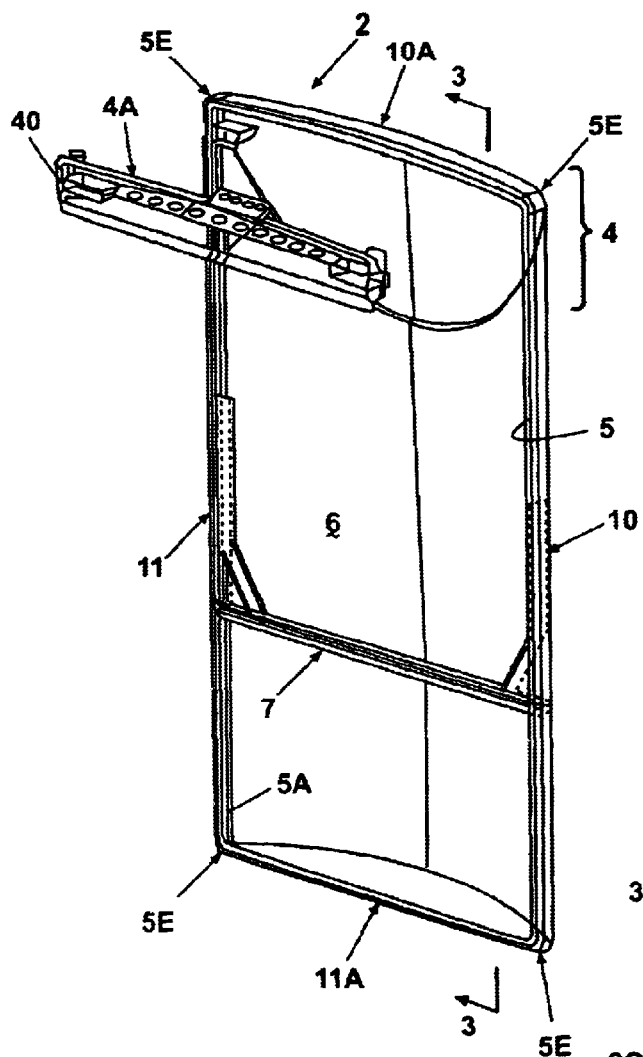
FIG. 1 is an exploded perspective view of a shell for a refrigerator door obtained in accordance with the invention.
Figure 2:
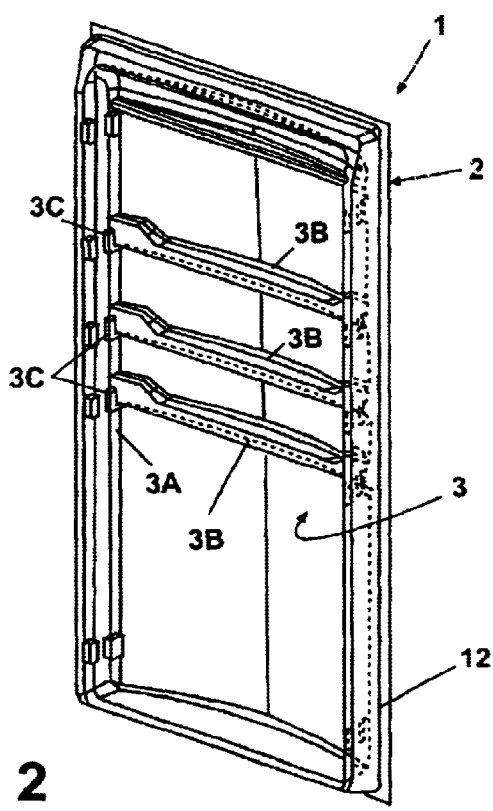
FIG. 2 is a perspective view of a door obtained in accordance with the invention.

With reference to FIGS. 1 to 3, a plastic refrigerator door is indicated overall by 1 and comprises a shell 2 and a door liner 3 fixed to this shell by known methods. The shell comprises a body 4 of thermoplastic material having its continuous edge 5 bent, towards the interior 6 of the body 4, which is for example of concave dished shape. Elongate elements can be secured to the upper and lower opposing ends of the body 4 to provide junction elements 4A (only one of which is visible in FIG. 1) with which usual hinge members are associated for pivotally mounting the door moving the door relative to the refrigerator housing (not shown). With the body 4 there is also associated a substantially U-shaped stiffening element 7 fixed in any known manner (e.g. mechanically by hot deformation) between opposing long sides 10 and 11 of said body. Long sides 10 and 11 of body 4 are connected to short sides 10A and 11A.

The door liner 3 is fixed in known manner to the body 4, and comprises shoulders 3A and shelves 3B which are supported by support elements 3C either fixed to or formed within said shoulders.

According to the invention, the edge 5 of the body 4 is smoothly bent to define substantially a perimetrical flange 5A extending towards the inner cavity 6 of this body. By this means, when the shell 2 and inner door 3 are assembled (and provided with a usual peripheral gasket 12 positioned around the door liner 3), the edge of the door is a perimetrical surface which blends from flange 5A to lateral wall 8 and wall 9 without discontinuity, so giving the finished article (refrigerator) a particularly attractive appearance.

The door 1 is obtained by the method of the invention. According to this (see FIGS. 4 and 5 in particular, in which parts corresponding to those of the already described figures are indicated by the same reference numerals), the concave dish shaped door shell 2 is initially obtained by conventional forming methods such as vacuum-forming or moulding. This is done within a usual mould. After being prepared in this manner, the edge 5 of the side wall 8 of the shell is subjected to a finishing operation to remove (and from any other part of the body 4) any burrs which may have been produced during forming. The body 4 is finished to the required dimensions for the next step of the construction process in which the edges 5 of the shell 2 (of substantially U cross-section) are bent to form the flange 5A extending towards its inner cavity 6, without parts being mutually superposed. This is achieved within the actual forming mould (within its "female" part) or in another female mould 20 (see FIG. 4) in which the shell 2 is placed following its formation. In this latter case the mould is treated internally such as to present a perfectly smooth surface free of impurities which could scratch the outer surface of the shell or become fixed to it. When in the mould 20, the shell 2 has edge 5 projecting from it.

A counteracting member 21, for example associated with an actuator 22 positioned above the mould 20 and movable vertically relative to the mould, is then inserted into the mould 20. As will be apparent to the expert of the art, this member comprises several parts 21A (only two are visible in FIG. 4) movable towards the walls of the mould 20, and for this purpose are associated with an actuator 21B carried by the member 21. The edge 5 of the shell 2, projecting from the mould, is then heated by heating members such as hot air generators, usual electrical heaters, halogen lamps or the like. When the material of the edge 5 has reached a temperature at which it becomes soft and deformable (depending on the material itself), a plurality of forming members 25, driven by respective actuator members 26 and distributed along the perimeter of the mould 20, are moved towards and into contact with the edge 5 to urge it towards the inner cavity 6 of the shell body 4. This edge is hence bent at 90° to the shell sides 8. The forming members 25 can comprise a plurality of elements 29 (see FIG. 5) moved along a plane perpendicular to the sides 8 defined by appropriate guides provided on the peripheral edge 20A of the mould 20. These elements are positioned for example along the sides 10, 10A, 11 and 11A of the body 4 and at its corners 5E. The elements 29 slide along those elements 29 adjacent to them to uniformly bend the edge 5 over the counteracting member 21 even at the corners, without creating creases along the edge or on portions thereof which become superposed or lift up. The elements 29 are driven by the actuators 26, which for example may be hydraulic. These elements are preferably wedge shaped, with their apex facing the edge 5, so as to form the flange 5A without forming member 25 digging into the edge.

The elements 29 are preferably coated with self-lubricating material, such as that known commercially as Teflon, to prevent the plastic surface of the shell edge 2 undergoing any damage or scraping effect.

After the bending, the elements 29 are withdrawn from the shell edge, as are the movable members 21A of the counteracting member which hence rises from the mould, to allow extraction of the shell body 4 with its edges bent towards its interior 6.

At this point the shell 2 is provided with junction elements 4A. As stated, junction elements 4A support the hinges for mounting of the door 1 on the refrigerator housing (not shown). The hinge (not shown) is for example of known type comprising a hinge arm fixed to the refrigerator housing, to be engaged with the seat provided in the junction element 4A on the door 1. A hinge pin is provided on the hinge arm. When the door 1 is mounted on the refrigerator, the pin engages a bushing mounted in junction element 4A in the door 1 to enable this latter to be moved about the hinge formed in this manner.

Alternatively, the hinge pin and the bushing on the door can be replaced by a suitably shaped injection-moulded box 40 which is premounted directly on the hinge arm and is able to rotate about the hinge pin on the same axis of rotation as the door. The box 40 can be inserted into a seat provided on the door junction element 4A by means of reacting fins or teeth, not shown (this making it possible to extract the box from the door if its direction of opening is to be reversed).

After shell 2 is formed and elements 4A and 7 are assembled, the inner door liner 3 is assembled to the shell 2 in a known manner. Following assembly of inner door liner 3 to outer door shell 2 suitable insulation, such as polyurethane can be injected into the door 1 in a known manner.

In a variant of the aforesaid method, the edge 5 of the shell 2 can be bent by one or more rollers running along this edge or by forming elements rotating about a hinge mounted on the edge 20A of the mould 20 and arranged to bend said edge towards the interior of the shell body 4.

The invention may be used with a modular system for constructing a refrigerator door, the system comprising elements which can be inserted or removed at successive times, depending on requirements.

We claim:

1. A method for forming a plastic outer shell for a structural plastic outer door for a household electrical apparatus comprising a plastic outer shell and an inner plastic door liner; the method comprising the steps of:

vacuum forming the shell in a first forming mould into a concave dished shape having a continuous side wall terminating in a perimetrical edge;

removing the shell from the first forming mould and transferring the shell to a second mould so that the permitrical edge of the shell at least partially projects from the second mould;

heating the perimetrical edge of the shell projecting from the second mould;

bending the perimetrical edge by urging successive portions of the perimetrical edge of the side wall towards the shell interior;

inserting at least one junction element into the shell;

inserting a stiffening element into the shell; and securing an inner door liner to the shell after the at least one junction element and the stiffening element have been inserted into the shell.

2. The method as claimed in claim 1, wherein the step of heating and bending the perimetrical edge comprises bending the perimetrical edge by thrusting the entire length of the perimetrical edge along the sides of the shell towards the interior of the shell simultaneously and continuously.

3. A method for forming a plastic outer shell for a structural plastic outer door for a household electrical apparatus comprising a plastic outer shell and an inner plastic door liner; the method comprising the steps of:

vacuum forming the shell in a forming mould into a concave dished shape having a continuous side wall terminating in a perimetrical edge;

heating said perimetrical edge and, thereafter, bending the perimetrical edge of the side wall while the shell is positioned in the forming mould to form a perimetrical flange extending toward the inner cavity of said shell;

bending the perimetrical edge by urging successive portions of the perimetrical edge of the side wall towards the shell interior;

inserting at least one junction element into the shell;

inserting a stiffening element into the shell; and securing an inner door liner to the shell after the at least one junction element and the stiffening element have been inserted into the shell.

4. The method as claimed in claim 3, wherein the step of heating and bending the perimetrical edge comprises bending the perimetrical edge by thrusting the entire length of the perimetrical edge along the sides of the shell towards the interior of the shell simultaneously and continuously.

\* \* \* \* \*